Dec. 15, 1970     B. W. O. DICKINSON III     3,546,927
ULTRASONIC TESTING APPARATUS
Filed Oct. 24, 1967     6 Sheets-Sheet 4
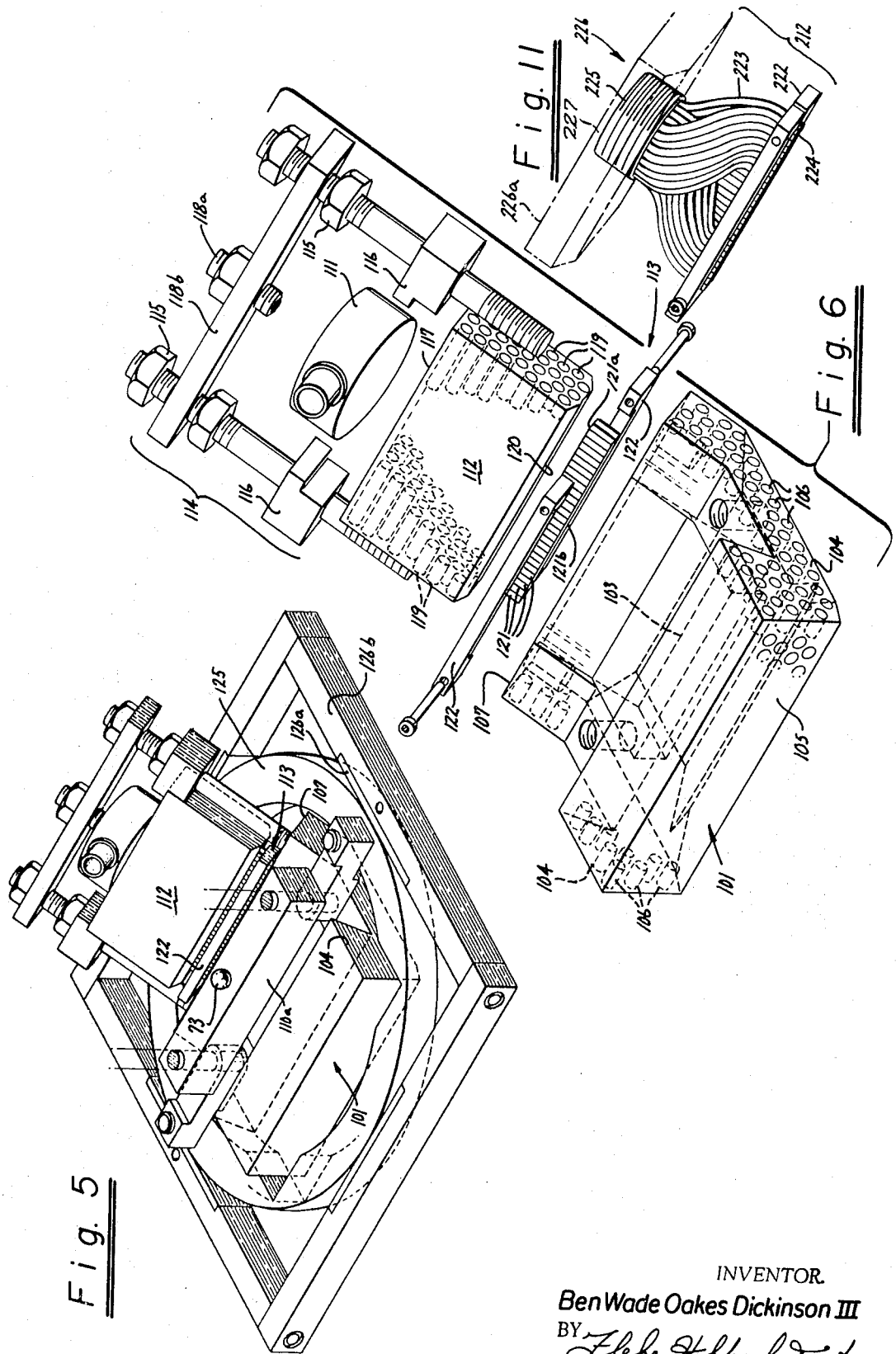
INVENTOR.
Ben Wade Oakes Dickinson III
BY Flehr, Hohbach, Test
Albritton & Herbert
Attorneys Dec. 15, 1970

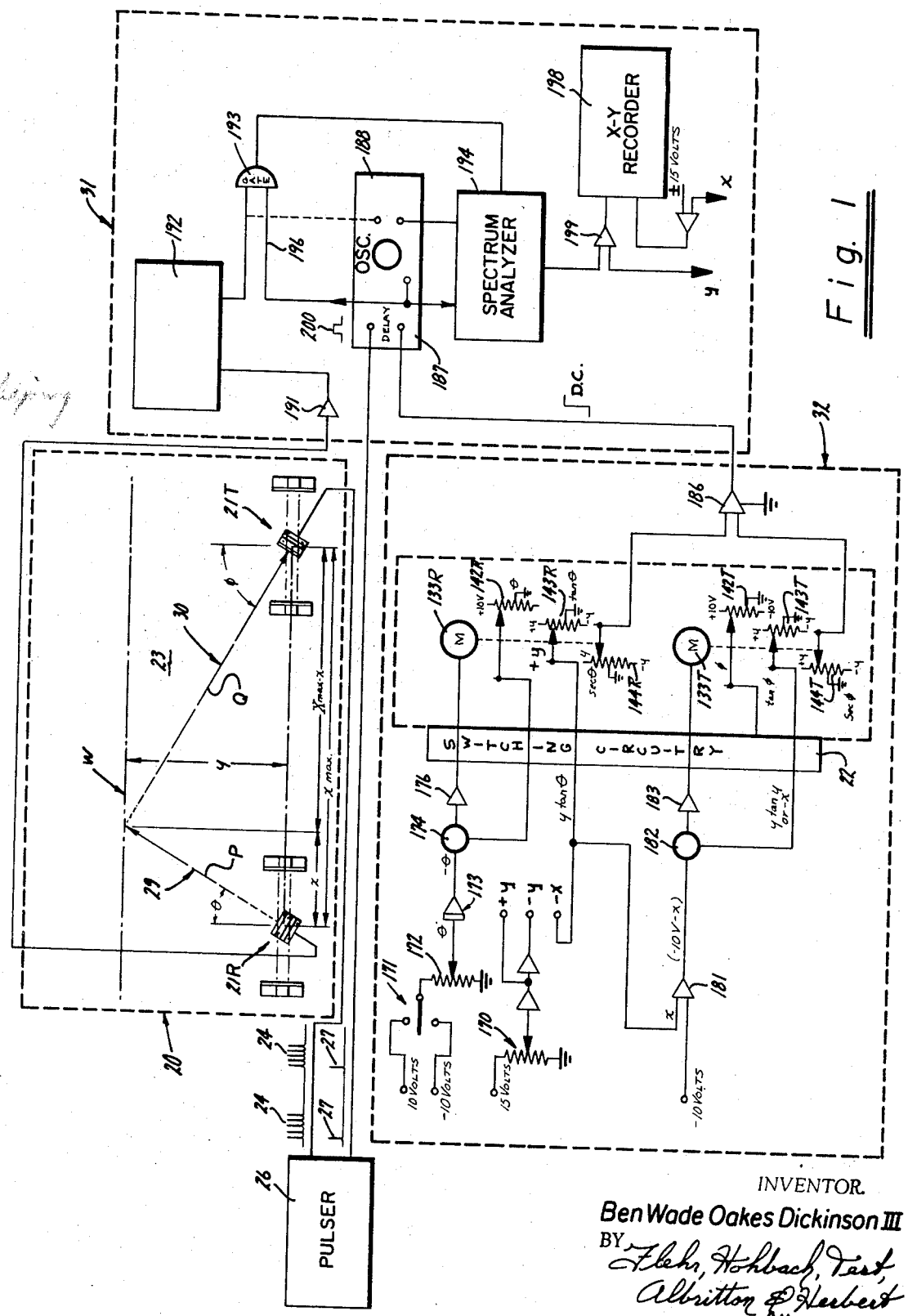

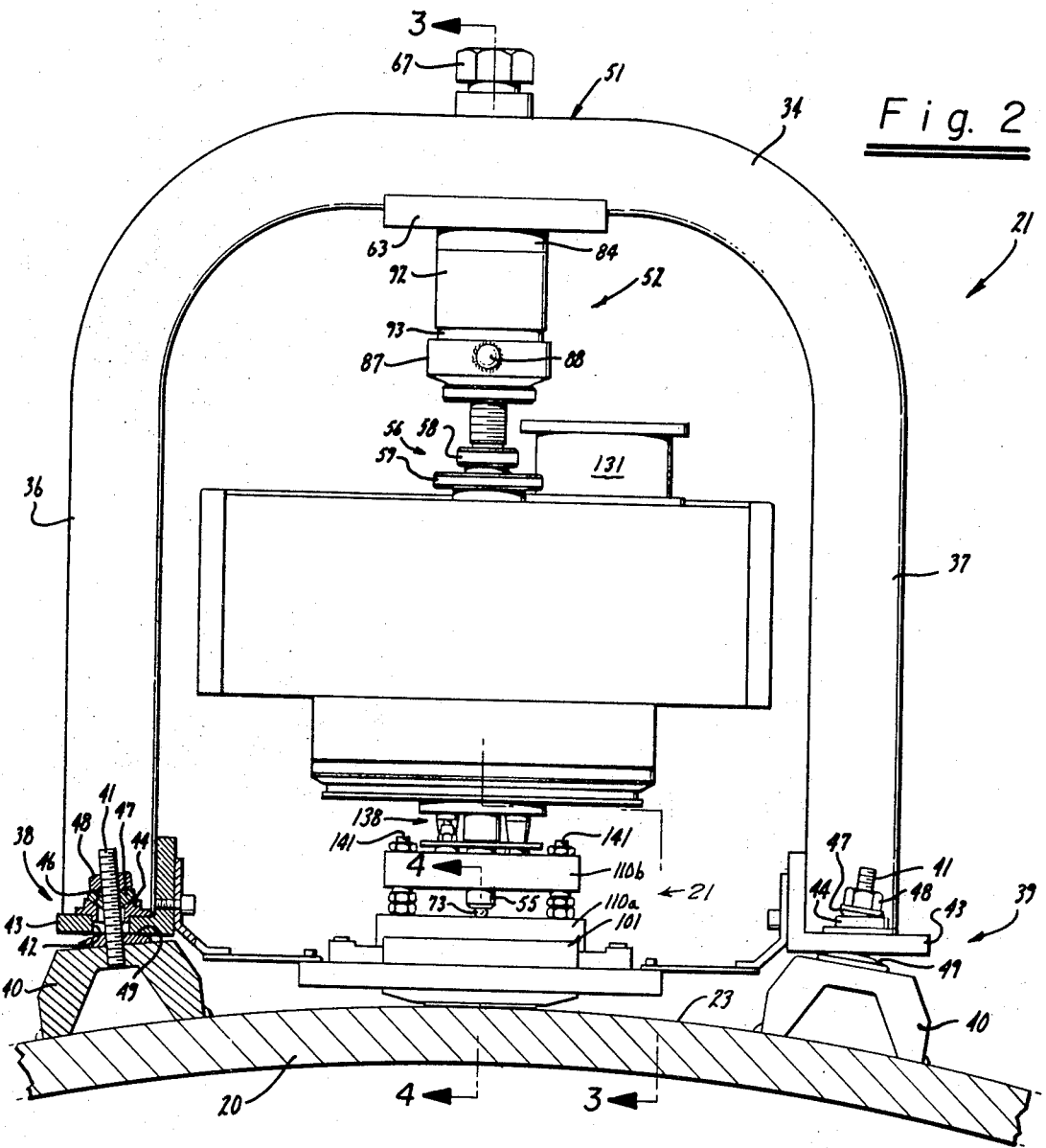

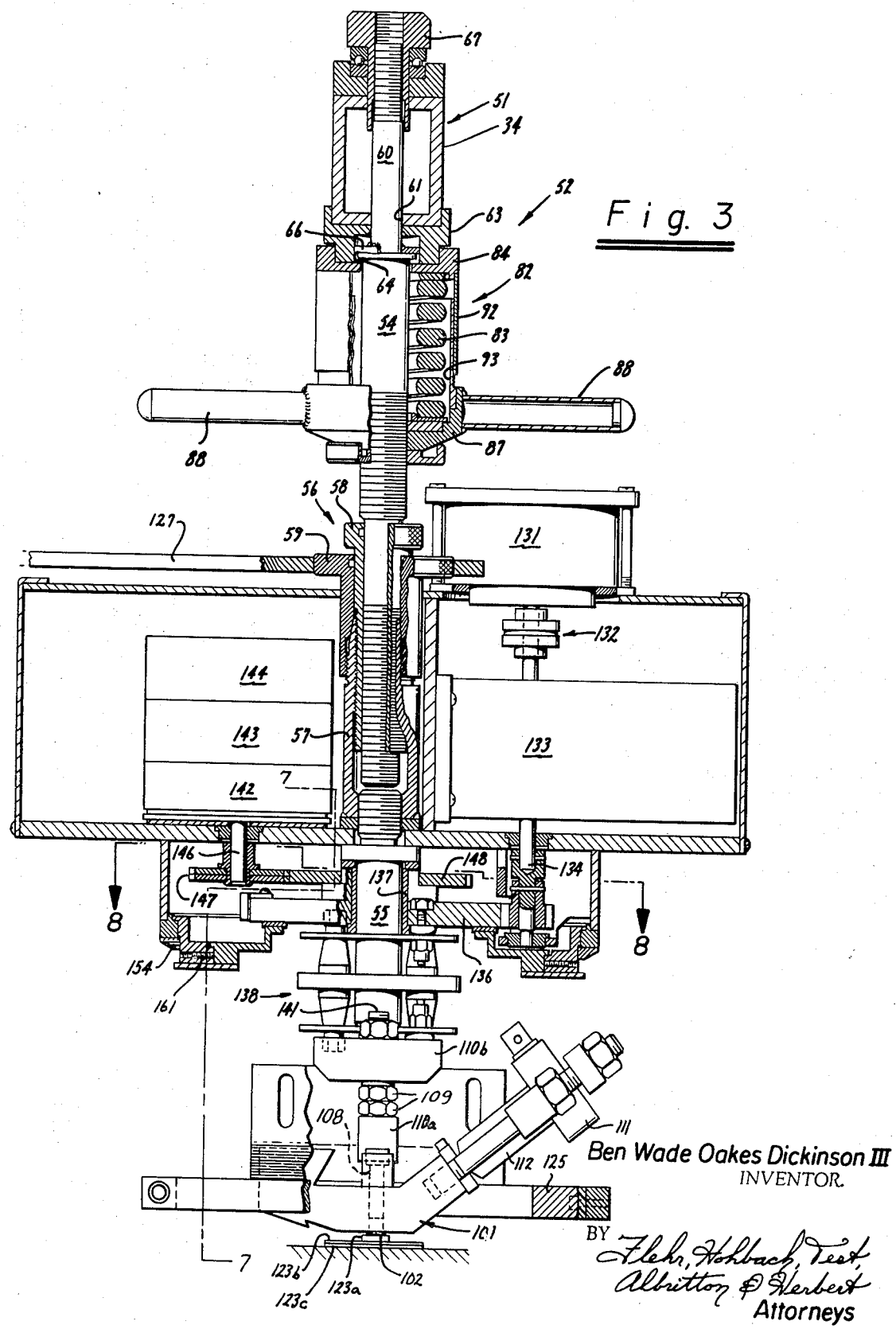

B. W. O. DICKINSON III 3,546,927

ULTRASONIC TESTING APPARATUS

Filed Oct. 24, 1967

INVENTOR.
Ben Wade Oakes Dickinson III
BY Flehr, Hohbach, Test, Albritton & Herbert
Attorneys

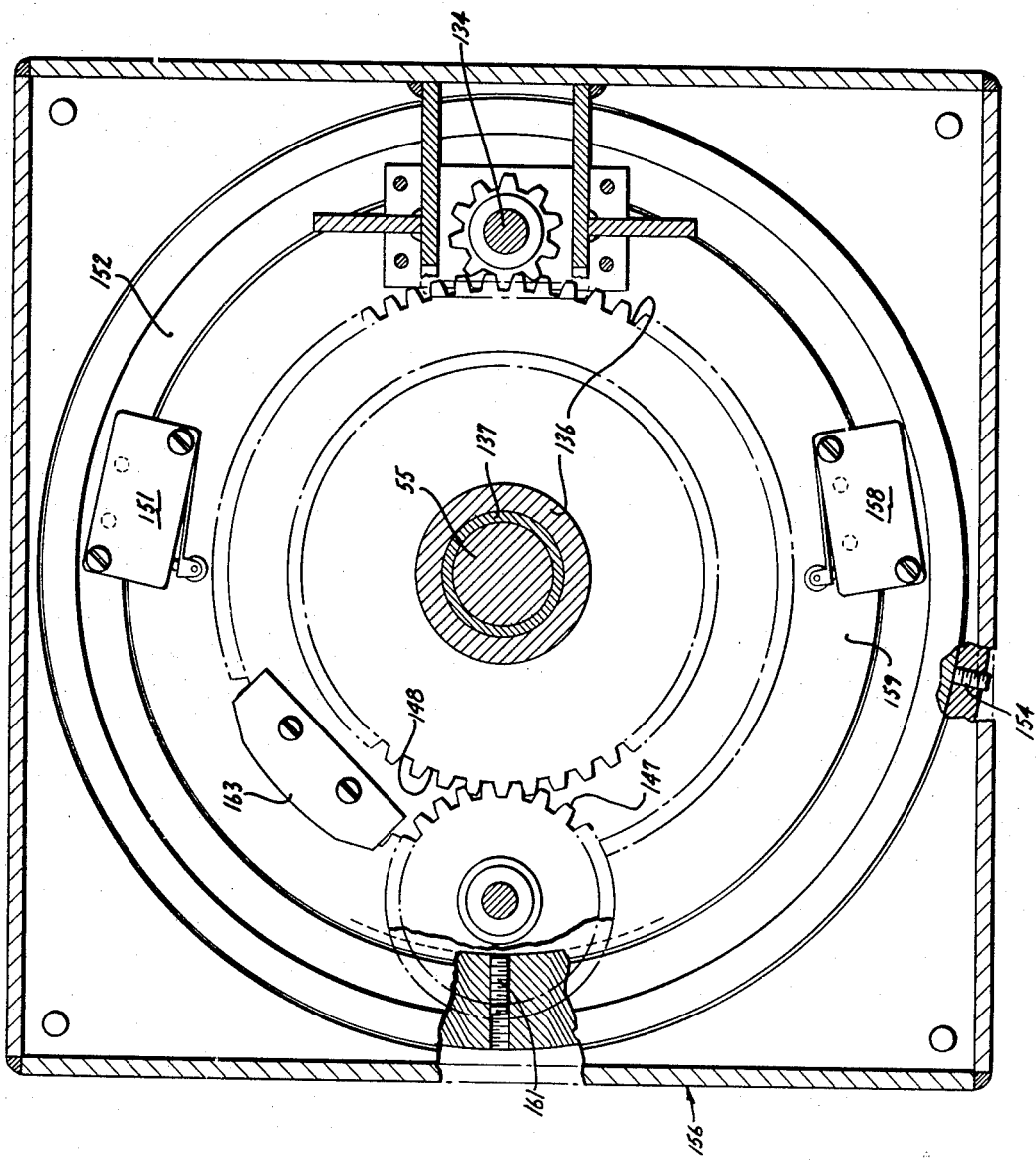

United States Patent Office 3,546,927
Patented Dec. 15, 1970

3,546,927
ULTRANSONIC TESTING APPARATUS
Ben Wade Oakes Dickinson III, 2125 Broderick St.,
San Francisco, Calif. 94115
Filed Oct. 24, 1967, Ser. No. 677,547
Int. Cl. G01n 29/04; H04r 17/00
U.S. Cl. 73—71.5        13 Claims

ABSTRACT OF THE DISCLOSURE

A highly collimated beam of ultrasonic wave trains is introduced into a member to be tested and passes through the member along a predetermined path. The time required to pass along the path is computed from geometry. Signals are received from the member in a highly collimated beam arriving between time gates bracketing the computed time. The ultrasonic wave trains received within the time gates are spectrally analyzed in synchronism with the time gates. Both the transmitted and received wave trains lie within highly collimated beams formed by bundles of elongate solid fibers incorporated in wave directors adapted to scan the beams about the member such that their intersection follows a predetermined path.

BACKGROUND OF THE INVENTION

This invention relates to an ultrasonic testing apparatus and method. In testing members with ultrasonic wave trains, it is generally desired to confine the transmitted and received wave trains into beams lying on well known paths so that information in the received wave trains unambiguously relates to interactions along such paths. Unfortunately, ultrasonic wave trains are deflected about the member by various mechanisms and travel along other paths so that the received ultrasonic wave trains contain spurious information and noise. Wave director assemblies such as disclosed in U.S. Patent No. 3,299,696, issued Jan. 24, 1967, entitled Apparatus for Generating, Directing and Receiving Ultrasonic Wave Trains have been of great value in collimating and directing wave trains and in rejecting spurious signals. There is, however, a need for improved ultrasonic testing apparatus and method having increased capability of rejecting spurious signals to thereby improve the signal-to-noise ratio and having a higher reproducibility of contact with the member being tested, lower losses, and improved collimation.

SUMMARY OF THE INVENTION

In general, it is an object of the present invention to provide an ultrasonic testing apparatus which will provide the above listed advantages.

Another object of the invention is to provide an apparatus of the above character, including a wave director, which transmits and receives wave trains in highly collimated beams without the use of collimating slots but which nevertheless is able to substantially eliminate diffraction effects.

Another object of the invention is to provide an apparatus of the above character which can transmit and receive highly collimated beams from the member being tested in a continuously variable direction so that the beams and their intersection point can be scanned about the member.

Another object of the invention is to provide an apparatus of the above character which is especially adapted for face contact onto surfaces of plate-like members (flat plates, tubes).

Another object of the invention is to provide an apparatus of the above character which operates to scan an ultrasonic beam about the member without internal collimating surfaces along which the ultrasonic wave trains are required to pass.

Another object of the invention is to provide an apparatus of the above character which can be mounted in highly reproducible contact with the member being tested.

Another object of the invention is to provide an apparatus of the above character in which the cross section of the beam can be formed or changed into an arbitrary complex shape by means of various arrays of acoustic fibers.

Additional objects and features of the invention will appear from the following description in which the preferred embodiments are set forth in detail in conjunction with the accompanying drawings.

In accordance with the above objects, there is provided apparatus for testing a member, including wave directors, in which highly collimated beams of ultrasound are transmitted and received from the member under test in bursts at spaced locations thereon so that the bursts of ultrasound travel through the member along a predetermined path which can be scanned throughout the member. High collimation of the beams is achieved by the use of bundles of fibers or rods. The ultrasound beam is introduced into the member at a substantially fixed angle to the normal at the point of contact on the surface thereof and is rotatable about the normal to scan the member. The angle of introduction and reception of the beams together with a length such as the distance between transmit and receive points defines the geometrical path length for the ultrasound passing through the member. The period of time required for the burst of ultrasound to travel along the path is computed using the previously measured group velocity of the particular mode of acoustic waveguide propagation. The received signals are gated or limited to those which arrive in an interval defined by time gates bracketing the computed time of arrival of said burst at the received location. The received ultrasonic wave trains are displayed in real time on an oscilloscope and frequency analyzed in a time-gated spectrum analyzer.

DESCRIPTION OF THE DRAWINGS

FIG. 1 is a schematic diagram of ultrasonic testing apparatus incorporating my invention.

FIG. 2 is a side elevational view of a wave director and mounting means for use in the apparatus of FIG. 1 and constructed according to the invention.

FIG. 3 is a sectional view of the wave director and mounting means of FIG. 2 taken along the lines 3—3.

FIG. 4 is a sectional view of the wave director taken along the lines 4—4 of FIG. 2.

FIG. 5 is an isometric view of the components of the wave director of FIG. 4.

FIG. 6 is an exploded isometric view of the wave director of FIG. 5.

FIG. 8 is a sectional view of the wave director of FIG. 2 taken along the lines 8—8 of FIG. 3.

FIG. 11 is an isometric view of a modified beam shaper and collimator for use in the apparatus of the invention.

DESCRIPTION OF PREFERRED EMBODIMENTS

Figures 7, 9, 10:
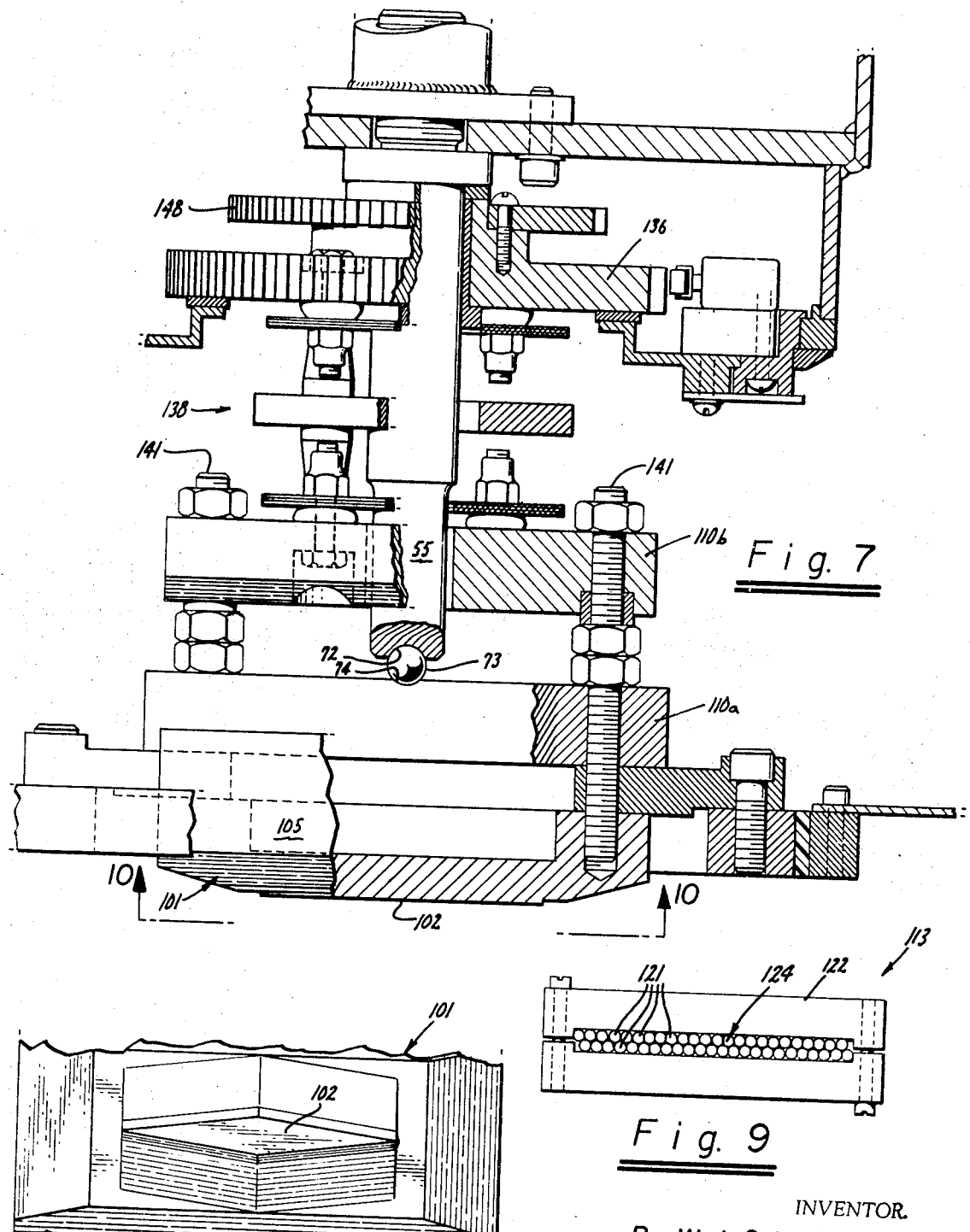
FIG. 7 is a view taken along the lines 7—7 of FIG. 3, with certain portions broken away.
FIG. 9 is a plan view of the beam collimator of a wave director of FIG. 2.
FIG. 10 is a bottom view of the wave director taken along the lines 10—10 of FIG. 7.

Referring to FIG. 1, the ultrasonic testing apparatus is illustrated in conjunction with a plate-like member 20 to be tested and consists of transmit wave director 21T and a receive wave director 21R (hereinafter designated as 21 in general) coupled to member 20 at spaced locations on planar surface 23. Each of the wave directors 21 includes a transducer for converting ultrasonic signals into electrical signals. Director 21T is energized by bursts of pulses 24 delivered by pulser 26. The pulser produces bursts of fast rise time electrical pulses having broadband frequency content and which are adjustable with respect to several parameters including the pulse height, the rise time, the spacing between individual pulses, the width of each pulse and the number of pulses per burst. Trigger pulses 27 which indicate the beginning of each burst of ultrasound are available from pulser 26 on line 28. Details concerning the nature of pulser 26 and the method of adjusting and optimizing the parameters are disclosed in my copending application Ser. No. 477,906, filed Aug. 6, 1965, now Patent No. 3,407,649, and entitled Method and Apparatus for Generating a High Power Ultrasonic Burst Pulse Signal.

Transmit and receive wave directors 21 are identical in construction to permit interchangeability of function which is accomplished by suitable switching circuitry indicated by block 22 in order to simplify the drawings. The beam transmitted or received by each of wave directors 21 is highly collimated, that is to say, the breadth of the beam at the 6 db point falls within a selectable half angle (ranging from approximately 2° to 20°) about its center line. The means for forming the beam will be discussed hereinafter.

The beam 29 of wave trains introduced into member 20 by transmit wave director 21T passes through the member and is deflected or scattered by interaction with flaws, anomalies, boundaries and the like, such as might exist in the weld line W shown, so that some of this energy is reradiated, redirected or scattered and available for reception by receive wave director 21R. Since director 21R only receives wave trains within a narrow beam or lobe of sensitivity, effectively a virtual beam 30, it is seen that the intersection of the beams 29 and 30 defines the region being investigated. The transducer within wave director 21R converts the received wave trains into electrical signals which are applied to signal analyzing circuitry 31. Wave detectors 21 are interconnected electrically through suitable circuitry and are moved to scan the member by direction control circuitry 32, as hereinafter described in detail.

WAVE DIRECTOR MOUNTING MEANS

Referring to FIGS. 2 through 7, means is provided for each wave director for mounting and rotating each wave director 21 in reproducible, intimate contact with member 20 under test. Such means includes a U-shaped arch 34 (FIG. 2) having downwardly extending arms 36, 37 adapted to be secured to member 20 by couplings 38, 39 attached to the ends of arms 36, 37. Couplings 38, 39 each include a foot portion 40 adapted to be separately attached to member 20 such as by use of a Nelson stud or being spot welded thereto. An upstanding bolt 41 is rigidly connected to each foot and is adapted to pass through a hole 42 in an end plate 43 closing the end of the respective arm. The other parts of the coupling consists of a socket 44 attached to that side of the end plate 43 within the arm, Socket 44 is provided with a spherical recess 46 which supports a washer 47 having the form of a segment of a sphere for mating with the recess. Washer 47 is secured to the bolt 41 by a nut 48. The other side of end plate 43 rests on a domed upper surface of foot 49 so that yoke 34 is positively secured to the member 20 even though the latter is curved and presents a nonplanar surface.

At its upper end yoke 34 consists of an arch 51 connecting arms 36, 37 and supporting a ram 52 for placing a wave director 21 into intimate contact with the member 20. Referring particularly to FIG. 3, ram 52 includes an upper shaft 54 and a lower shaft 55 which are held in axially aligned end-to-end relation by coupling means 56 adjustably securing the shafts together so that they may be extendable away from each other along a common axis to adjust the contact between a wave director and test member 20. Such means 56 comprises a sleeve 57 threaded over lower shaft 55 and extending toward shaft 54. Sleeve 57 is split at its upper end and is provided with internal and external threads. Sleeve 57 is compressed between a shaft length adjusting collar 58 threadedly engaging the lower end of upper shaft 54 and a shaft locking collar 59 having internal threads lying on a conical section for engaging the external threads of sleeve 57 and applying inward pressure thereto when tightened.

The end 60 of shaft 54 passes through holes 61, 62 formed in arch 51 and is keyed thereto by an arch connection 63 abutting the inside of arch 51 (FIG. 3). Connection 63 is provided with a slot 64 extending laterally away from shaft 54 for receiving a plate 66 fastened to shaft 54 to prevent it from turning. The dimensions of the slot 64 in the direction along shaft 54 is greater than plate 66 so that shaft 54 is vertically movable a short distance. This permits the shafts to move a short distance so that forces can be transmitted through them without encountering a resistance from the mounting means.

A take-up nut 67 threadedly engages the end 60 of upper shaft and serves to lift the same vertically when turned down. The bottom of the lower shaft 55 is provided with a recess 72 for receiving a pivot ball 73 set in a recess 74 in a portion of wave director 21 and transmits forces downwardly thereto, as hereinafter explained.

A main spring cage 82 (FIG. 3) is keyed to arch connection 63 and houses a main spring 83 which is centered and held at its ends in a main spring retainer 84. The spring is compressed by an adjusting collar 87 provided with a plurality of outwardly extending handles 88 for turning the same. The adjusting collar is threaded to the upper shaft 54 to transmit forces thereto from spring 83. Cage 82 is split into two telescoping cylinders 92, 93, cylinder 92 being fixed and connected to the arch connection 84 while the cylinder 93 is connected to the adjusting collar 87 and moves with it. Indicia (not shown) are provided on cylinder 93 and are read by the coincidence of the lower end of cylinder 92 to indicate the amount of force corresponding to a given compression of the spring 83.

WAVE DIRECTOR

Referring particularly to FIGS. 3 through 6, each wave director 21 includes a coupling frame assembly consisting of a prism 101 formed of a solid piece of metal having a flat raised output surface 102 (FIG. 10) of prismoidal outline facing away from lower shaft 55 and adapted to be forced thereby into intimate contact with member 20. As shown in FIGS. 4, 5 and 6, prism 101 is provided with a recess 103 in its top and above surface 102. Recess 103 is filled with layers of 1/16 square inch opening steel screening and lead to provide suitable selective acoustic damping action and to reduce internal acoustic reverberations. Prism 101 is drilled on its sides 104 and front 105 with 1/8 inch diameter holes 106, 1/4 inch deep. Steel wool (#0000) is pounded into the holes which are then capped and sealed with lead. The filled holes serve the same purpose as the filled recess 103. For additional sound deadening, the exterior surfaces of the prism can be covered with three layers of 1/16 square inch opening screening soldered thereto.

An ultrasound input surface 107 is formed on one side of the prism to face away from the surface 102 at an angle from about 50° to 55° and preferably about 52° from the normal to output surface 102. The portion of prism 101 between input surface 107 and output surface 102 is solid metal having good ultrasound propagation characteristics, such as steel. Suitable bolt and nut means 108 secure the prism through spacers 109 to a strong steel thrust bar 110 into which is formed the recess 74 for receiving the thrust of the ram as delivered through the pivot ball 73. Means 108 extends further upwardly beyond the bar 110 and supports a driving frame cross piece 110b, to be hereinafter described.

Means is provided for receiving the ultrasound output of a transducer 111 and for shaping and collimating the output into a well defined beam directed into surface 107 of coupling prism 101. Such means includes a series coupled acoustic beam shaper 112 and a collimator 113. Clamping means 114 is positioned on each side of the beam shaper and collimator and includes threaded stud and nut means 115 for securing clamping blocks 116 into engagement against the upper surface 117 of shaper 112 to secure the latter and interposed collimator 113 into intimate engagement into the surface 107 of prism 101. Transducer 111 is secured into intimate contact with surface 117 of the shaper by set screw 118a threaded through a cross bracket 118b mounted on the upper ends of means 115.

The beam shaper 112 is formed from a solid steel block (FIG. 6). Holes 119 are drilled in the sides of the block to a depth such that an ultrasound path is created which gradually changes in shape from the predetermined shape of surface 117 to the desired shape at an output surface 120, the latter conforming to the cross section of the input surface of collimator 113. As shown, for an expansion of the beam, the holes 119 nearer surface 117 are deeper, while those progressively further away become progressively shallower allowing the beam to expand. The holes 119 are ⅛ inch in diameter and are filled with steel wool capped with lead to prevent unwanted reverberation within the shaper.

The collimator 113 consists of a plurality or bundle of elongate rods or fibers 121 which may be composed of metal, glass, plastic or other suitable ultrasound wave conduit which are held in generally parallel alignment by bracket 122 which surrounds the fiber bundle (FIG. 9). The upper ends of the fibers 121 terminate in a common surface 121a which is generally normal to the fiber axes and is approximately the same configuration as the output surface 120 of the shaper 112 so as to receive the shaped beam. The other end of the bundle of fibers terminates in a common surface 121b adapted to be pressed into ultrasonic contact with input surface 107 of prism 101 through a deformable thin shim of material such as lead. Surface 121b is preferably concave and together with the lead shim forms an ultrasound lens which has a positive focusing property.

In a typical collimator for use at 1 to 3 mHz., the fiber bundle included about 100 fibers, each of which had a cross section of about one wavelength, i.e., 1/16–3/32 inch diameter, and several wavelengths long (about ¼ inch). The fibers may be made of pins of carbon steel, aluminum, plastic, glass, or other acoustic conducting material or may be constructed of liquid filled tubular members. In general, the space between the fibers intermediate their length is left open and the fibers are formed with smooth exterior surfaces. However, for some purposes it is desirable to form the fibers with threads such as common helical threads or with a sound absorbing coating, such as lead filled with steel screening or fibers. The latter serves as damping material for surface waveguide modes to thereby improve collimation.

The collimator 113 forms the output of the transducer into a highly collimated beam having a pattern confined within an angular spread of a few degrees. For the 1–3 mHz. unit discussed above (FIG. 5) the beam was confined with −6 db points in angular spread of about 2–7° in the plane of the long or major axis and about 20° in the minor or short axis.

The wave director is adapted to rotate clockwise or counterclockwise with respect to member 20 as its output surface 102 is urged into ultrasonic contact with the member 20. Thus, suitable coupling shims 123a, b, c are provided in order to obtain reproducible contact with the member and can also be provided to assure good contact between transducer shaper, collimator and coupling prism input and output surfaces. Two types of shim material are preferred, soft metal or plastic. Suitable metals include lead, aluminum and copper, and suitable plastics include (Teflon) polytetrafluoroethylene. Generally, it is preferred to use a lower deformable shim 123c of lead to eliminate effects due to roughness of the surface of the member 20 and an upper polytetrafluoroethylene shim 123a having a low coefficient of friction as a bearing material. An interposed steel shim 123b is placed between the lead and Teflon shims to avoid tearing the lead shim as the wave director contact surface 102 rotates. Typically, each of the shims is about .005 inch thick and can be covered with a suitable lubricant such as grease.

A ring 125 is mounted to spacers 109 so as to lie in a plane surrounding coupling prism 101 and rigidly connected therewith. Guide runners 126a made of Teflon (polytetrafluoroethylene) are mounted in bracket 126b and abut the outer surface of ring 125 to stabilize its rotation and that of the wave director.

SCANNING AND POSITION INDICATING MEANS

Referring particularly to FIG. 3, means are provided for rotating each wave director 21 with respect to member 20 to scan the beams thereabout and includes a servomotor 131 mounted to the ram 52. The servomotor is connected through a coupling 132 to suitable gear box 133 which reduces motor speed to a low value. The output of the gear box is connected through a pinion means 134 which drives a bull gear 136 mounted for rotation about lower shaft 55 on bearing 137. A laterally flexible drive coupling 138 is attached at its upper end to the bull gear, at its lower end to drive cross piece 110b with bolt and nut means 141 and serves thereby to transmit torque to the wave director 21 while not requiring exact alignment therebetween.

Means for measuring the angular position of such wave director 21 is provided and consists of ganged potentiometers 142, 143, 144 having a common shaft 146 and driven through a potentiometer pinion gear 147 of anti-backlash type which engages a potentiometer drive gear 148 secured to bull gear 136. The output of the potentiometers 142 through 144 are respectively linear, cotangent, and cosecant of the angular position of wave direction 21 with respect to arbitrary reference angles as hereinafter defined. The diagrammatic illustration of FIG. 1 shows the servomotors 133 and the potentiometers 142 through 144 in schematic form together with their electrical connections to associate circuitry, the labels T and R being added to designate the transmit or receive modes of operation respectively.

Referring to FIGS. 7 and 8, there is shown means for limiting the rotation of the collimating means in each of the clockwise and counterclockwise directions. Such means consists of a clockwise limit switch 151 mounted on a support ring 152 which is angularly adjustable to carry limit switch 151 to any desired position about bull gear 136. The position of support ring 152 is fixed by set screw 154 passing through side wall of limit switch housing 156. A counterclockwise limit switch 158 is mounted on a support ring 159 lying within ring 152 and is angularly adjustable to carry the limit switch 158 to any desired position with respect to support ring 152 at which position it is fixed by set screw 161 which engages a lower side wall 162 of ring 159 and clamps rings 159 and ring 152 together. Limit switches 151, 158 are conventional roller actuated microswitches and are connected through relays in series with servomotor 131 to disconnect the same when the switch is actuated by being engaged with a switch cam 163 screwed to bull ring 136.

ASSEMBLY OF WAVE DIRECTOR TO MEMBER UNDER TEST

Foot portions 40 are attached, such as by tack welding, or by Nelson studs, to the member at spaced apart locations on either side of the desired points of introduction and reception of wave trains and each wave director yoke 34 is then attached by the couplings 38, 39. The adjustment operations are the same for both receive and transmit wave directors so that the following description will be made in the singular and should be taken as applicable to both. When necessary, the suffixes T and R will be appended to identify transmit and receive units. It is assumed that the upper and lower shafts 54, 55 are initially adjusted into close proximity to each other. After yoke 34 is mounted, the shaft extension collar 58 is released by loosening the locking collar 59 and the shafts are extended to bring the prism into touching contact with the object to be tested. The adjusting collar 87 is then released and the spring tension increased to the amount necessary to exert the desired force. The force is related to the material of coupling shim 129 that is used between the prism 101 and the test object. For the teflon or lead a force of about 1,000–2,000 p.s.i. has been found satisfactory. After the mentioned forces have been brought to bear and the electrical connections made to associated circuitry 31, 32, the wave directors 21 (T and R) are ready for operation.

DIRECTION CONTROL CIRCUITRY

As shown in FIG. 1, direction control circuitry 32 utilizes the output information from potentiometers 142 through 144 T and R to couple or gang the motion of the wave directors 21 together. Thus, analog control circuitry 32 is supplied with reference voltages of +10 volts and −10 volts, which voltages are available to the various components as shown. As shown in the diagram, the distance between wave directors is given the arbitrary reference value 10 volts and all other distances are measured relative to this value. Thus, ±y is generated by suitable amplifiers as a fraction of the reference by potentiometer 170 and is applied to the various components as shown. It is easily shown that the following relationships hold:

$$\tan \theta = \frac{x}{y} \qquad y \tan \theta = x$$

$$\cos \theta = \frac{y}{P} \qquad y \sec \theta = P$$

$$-\tan \varphi = \frac{1-x}{-y} \qquad -y \tan \varphi = -(1-x)$$

$$\cos \varphi = y/Q \qquad y \sec \varphi = Q$$

and the distance $P+Q = y[\sec \theta + \sec \varphi]$.

A direction control switch 171 supplies either polarity of the reference voltage to a rate potentiometer 172 connected to an integrating amplifier 173 to supply it with information concerning the desired rate of change of the angle $\theta$ of wave director 21R. The output of integrating amplifier 173 is $-\theta$ and is applied to one input of a comparator 174, the output of which drives motor 133R through a servomotor drive amplifier 176. The other input of comparator 174 receives the output voltage from linear potentiometer 142R which represents the actual angular position, $\theta$, of the device. Whenever there is a difference between the measured and derived values, the comparator 174 and amplifier 176 power motor 133R to rotate the collimating means of the wave director until the difference is eliminated.

Potentiometer 143R supplies $y \tan \theta (=x)$ which defines an intersection point for the beams which is located on weld line W. Potentiometer 143R is supplied with reference voltages of ±y indicative of the vertical distance between the point being investigated and the line joining the wave directors. Accordingly, the output of potentiometer 143R is $y \tan \theta = x$ and is applied to one input of an adder 181, the other input of which receives reference voltage (−10 volts). The output of adder 181 is (10−x) and is applied to one input of a comparator 182, the other input being connected to the output of potentiometer 143T which also is biased by reference voltages ±y. Accordingly, the output of potentiometer 143T is $y \tan \varphi$ which is equal to the actual distance (10−x). If the computed and actual 10−x values are equal, the transmit and receive director intersect at the point being investigated on W. If they are different, the comparator 182 supplies an output signal which is developed by a servomotor amplifier 183 into a signal suitable for driving the transmit director motor 133T to a different position to cancel the difference. The output of the linear potentiometer 142T of the transmit wave director 22 is not utilized when the latter acts in a transmit capacity. If the functions of wave directors 21T, 21R are interchanged, obviously the connections must be interchanged by suitable switching circuitry 22 which has been shown in block form for the sake of simplicity.

The secant $\theta$ potentiometer 144R and the secant $\varphi$ potentiometer 144T are biased by the ±y voltage. The sum of the outputs of these potentiometers is $y \sec \theta + y \sec \varphi$, equals the sum of the hypotenuses $P+Q$ of the right triangles along which the beam must travel and accordingly the total distance traveled by the beam. These outputs of potentiometer 144R and 144T are applied to a summing amplifier 186 which develops a DC output level proportional to this distance. The DC output level is applied to a delay network 187 incorporated in an oscilloscope 188.

SIGNAL ANALYZING CIRCUITRY

Signal analyzing circuitry 31 includes a pre-amplifier 191 which receives the output signal from the transducer of the receive wave director 21R and amplifies it to a level suitable for being sent over long wires to thereby permit remote location of the remainder of circuitry 31 from the member being tested. The signal may then be passed through a band pass filter 192 network which permits the frequencies of interest (about 1 mHz.–3 mHz.) to pass one input of a low noise, variable width time gate 193 which controls the passage of the received wave train signal to a spectrum analyzer 194. The control input 196 of the gate is connected to the output of the delay network unit 187. The delay network puts out a sample gate pulse 200 which is a square wave. Pulse 200 lags trigger pulse 27 by a time determined by the DC input level applied to the delay network 187 from amplifier 186 and lasts for a short period such as 5 microseconds or comparable to the burst length of pulses 24. Thus, the leading and trailing edges of pulse 198 bracket the time interval during which signals should be received from member 20 after passing along predetermined path P, Q. Spectrum analyzer 194, the display of oscilloscope 188, and gate 193 are all controlled by pulse 198 being turned to an "on" state by the leading edge and an "off" state by the trailing edge.

The output of spectrum analyzer 194 is applied to the display or vertical axes of the oscilloscope 188 and is also added by summing amplifier 199 as a measurement of flaw size $\Delta f$, to the Y axis of an XY recorder 198 whereat it is recorded as a pip appearing on the traces of the line being investigated. The X and Y inputs of the XY recorder are connected to the $x$ and $y$ voltages respectively so that $x$ information on the XY recorder will show the line traced out by the intersection of the beams in passing through the member under test and the Y trace includes flaw size information since it includes the modulation $\Delta f$ interposed thereon $(Y+\Delta f)$.

SUMMARY OF OPERATION

Assuming that the system is completely assembled as shown in FIG. 1, the operation may be summarized as follows. The value of y is set into potentiometer 170 to define a line along which beam 29 will scan. Switch 171 is then closed to connect one of the reference voltages to potentiometer 172 so that the latter will supply rate of desired change information to integrator 173 and causes beam 29 to sweep along the line W. As previously described in connection with the direction control circuitry, the direction of beam 30 is controlled so that the beams 29, 30 track together, intersecting on line W. If it is desired to move line W and to scan along another region or line of the member, the value of y is changed by a suitable adjustment of potentiometer 170. Obviously, the entire member 20 can be scanned by alternating the value of y slightly after each sweep along a line W.

When a transmitted signal as on beam 30 interacts with a flaw and is scattered thereby, the scattering patterns are such that a significant amount of signal is scattered into a wide angle about the flaw. This is because the complex waveguide acoustic mode of propagation of the ultrasound interacts with the flaw to generate new modes in a line parallel to the flaw. Other modes are scattered reradiated or redirected differently by the flaw in other directions but over an angular width of about 10°–65° (in which the present invention is designed to operate) around the line determined by specular reflection, the scattered energy level is reasonably uniform. The receive beam 29 (can be thought of as a virtual transmitted beam) receives those signals which are scattered in its direction. Thus, when there is a flaw at the intersection of the beams, the flaw redirects some of the impinging energy from beam 30 into beam 29 so that it is received by receive wave director 21R. Because of the highly collimated nature of beams 29, 30, the information received is strongly free of spurious information reflected from other portions of the member being tested.

The received signal is preamplified to preamplifier 191 to permit remote installation of the remainder of the circuitry without adverse effect to the received signal. The signal is then passed through filter 192 which includes two alternatively applied sections, a fixed band-pass filter covering the band from 1.8 to 3.5 mHz. and a narrow passband which is tunable to selected frequency. The frequency tuned is based upon tests conducted concerning the acoustic waveguide characteristics of the member being tested, i.e. its thickness, metallurgy and other characteristics. The signal output of filter 192 is amplified and displayed on oscilloscope 188 to present a conventional ultrasonic display.

Meanwhile the delay in network 187 generates time gate pulses having an initial delay from the timing of pulses 27 which depends upon the DC level as applied from amplifier 186. The time gates used in the analysis of the signal are developed from information supplied by potentiometers 144R and 144T and summing amplifier 186 to provide a direct measure of the sum of the path lengths P and Q. The group velocity of ultrasonic waves through the member is measured and the gain of amplifier 186 set to provide an output DC signal having a level indicative of the time required for the ultrasound to traverse paths P, Q.

In this way, the signal which is normally very noisy, being a composite of signals reflected from flaws and boundaries and the like, can be refined or time gated to eliminate the spurious signals by using the set of moving narrowly spaced time gates which tracks the time when the signal ought to be received, i.e., it predicts where this signal should be received. The time is consequently determined as a dependent variable upon the geometry and is used to define the analysis time so that the system is locked together utilizing these time data.

Additionally, the time gates are also synchronized to the path length through the object to control the time display of the main band of an intensified zone defined thereby which can then be displayed on oscilloscope 188. This time zone is represented by a pulse 200 which controls gate 193 to permit the portion of the signals received during pulse 200 to pass to the spectrum analyzer 194. The spectrum analyzer is set to scan the input signal by heterodyning it with the output of a variable frequency oscillator contained within the analyzer 194. This is done by making the frequency based display operate at approximately 10 kHz. per centimeter so that total display of approximately 100 kHz. is available for presentation on oscilloscope 188. The filter network 192 is also adjusted to have a passband of 100 kHz. Thus, the base line on the CRT trace has the time gates shown on it and, accordingly, displays time information both the conventional voltage and the intensity of a signal as mutually determined as being within that time gate and within the spectrum analyzer bandpass. This latter bandpass is defined by the set-in center frequency of the spectrum analyzer plus and minus one-half of the total display dispersion. Since the spectrum analyzer is set to a narrow dispersion, say 10 kHz. per centimeter, the number of hertz per centimeter of display or dispersion has been made extremely narrow so that the zero frequency is effectively far removed from the displayed signals (based on a linear approximation). Accordingly, the spectrum analyzer is operated as a time gated device synchronized to the pulses 200 and is serving as an active narrow band filter for the signals lying within the time gate.

FIG. 11 discloses a modified collimating beam shaper 212 which can be substituted for the shaper 112 and collimator 113 as suggested by the positioning of shaper 212 of FIG. 11 with repsect to the exploded view of the wave director shown in FIG. 6. Shaper 212 includes a bundle of acoustic fibers 223 which are secured in clamp 222 at one end and terminate in a planar output surface 224 adapted to be placed in contact with surface 107. The other end of the fiber bundle is secured in a threaded fitting 225 engaging a support block 226 adapted to be engaged at its ends 226a, b by blocks 116. The ends of the fiber in fitting 225 form a circular input surface 227 adapted to be pressed into engagement with the transducer 111 output surface.

Fibers 223 are gradually rearranged into an arbitrary configuration intermediate the length of the bundle so that the circular input cross section of surface 227 is converted into a cross section of arbitrary desired shape, such as the linear array illustrated. If this shape is clumped in into a shape such as a square or circle, then at the frequency used the beam tends to be more broadly dispersed angularly (10–20° to −6 db point). If the fibers are arranged in a long thin linear array, such as in FIG. 11, a narrow beam results (2–7° to −6 db down points in the plane of the major axis). By making a dumbbell shape such that more fibers are on the ends rather than the center of the output surface, a two lobe beam results. The angular beam width or dispersion in the far field (Fraunhofer zone) can then be calculated from a relationship analogous to optics or radio antennae analysis $$\text{sine beam half angle} = \frac{\text{Constant Acoustic Velocity}}{\text{Array width in plane of beam angle of interest} \times \text{frequency}}$$

In effect, almost any beam shape or combination of lobes can be achieved by shaping and rearranging the output end of the bundle of acoustic fibers.

If the fibers are arranged in a converging pattern as if arranged around the sides of a cone, a focusing array is achieved, if all fibers are the same length. In all cases the output surface of the fiber acoustic array can be placed directly against a test object such as 20 in a fixed arrangement with a suitable deformable coupling shim to fill the gap.

The breadth of the beam is determined to a large extent by the arrangement of the acoustic fibers. The fibers operate very much like individual radiators in an array so that many different beam shapes focusing, and divergence.

The fibers 223 are similar to those described in connection with collimator 113 but are longer. For operation in the range of above 1.5 mHz. carbon steel rods or fibers in the range of above about 1.5 mHz. carbon steel rods or fibers of from $\frac{1}{20}$ to 2 wavelengths in lateral dimension are or fibers are less lossy, permitting greater transmission of ultrasound energy.

To those skilled in the art to which this invention relates, many changes in construction and operation and widely differing embodiments will suggest themselves without departing from its spirit and scope. For example while there is shown one transmit wave director and one receive wave director herein, it will be appreciated that a plurality of such wave directors can be mounted at spaced locations about the member and their function interchanged by suitable switching devices. This permits inspection of the member being tested from a multiplicity of directions and can be used to locate anomalies in the member by purely geometrical techniques. In this connection, reference is made to my copending applications Ser. No. 677,578 filed Oct. 24, 1967, entitled Method for Detecting the Existence and Location of Localized Stresses Using Ultrasonic Waves and Ser. No. 677,579, filed Oct. 24, 1967, entitled Method for Detecting Bond Strength Variations Using Ultrasonic Waves, each of which is filed concurrently herewith, which describe systems wherein such a multiplicity of wavedirectors are utilized. It should be understood, therefore, that the disclosures and descriptions herein are purely illustrative and are not intended to be a limitation thereon.

I claim:

1. In wave director apparatus for testing a member, an ultrasonic transducer for generating sound signals, signal shaping and collimating means coupled to said transducer for receiving or transmitting signals therefrom and for forming said signals into a beam having a predetermined pattern, said shaping and collimating means comprising a plurality of elongate solid fibers bound together in a bundle, each of said fibers terminating at one end in a first common surface for ultrasonic communication with said ultrasonic transducer and terminating at the other end in a second common output surface, said bundle of fibers defining individual collimated ultrasound paths therealong so that ultrasound transmitted through the fibers is formed into a beam corresponding to the shape of the second common surface, coupling means having an input surface urged into intimate contact with said output surface of said shaping and collimating means and having a second surface adapted to be pressed into intimate contact at a location on said member, said coupling means serving to transmit the beam between said output surface and said second surface said input surface of said coupling means being formed at a substantial angle to the normal of the surface of the member at said location.

2. Wave director apparatus as in claim 1 further including a solid block of ultrasound transmitting material having said block being coupled in series with said fiber bundle and an input surface to receive ultrasound from said transducer and an output surface having a predetermined desired cross section, the region between said input surface and said output surface being gradually changed to shape the beam to the desired configuration.

3. Wave director apparatus as in claim 1 wherein each of said fibers is made of metal.

4. Wave director apparatus as in claim 1 further including means for urging said coupling means into intimate contact with the member to be tested, said last named means including a yoke attached to the member at points spaced from said area of contact, said yoke having an arch portion generally opposed to said area of contact, an extendible ram interposed between said coupling means and said arch portion.

5. Wave director apparatus as in claim 4 further including a servomotor coupled to said coupling means for rotating the same, and means for measuring the angular position of said coupling means.

6. Wave director apparatus as in claim 1 further including shim means interposed between said coupling means and said member, said shim means including a deformable shim adapted to be pressed into intimate engagement with the member and another shim having a low coefficient of friction.

7. A wave director apparatus as in claim 1 further including means for mounting said coupling means for rotation about the normal of the second surface thereof at said location so that ultrasonic wave trains can be scanned about the member.

8. Wave director apparatus as in claim 1 in which said second surface of said coupling means is defined by a raised output region defining a surface having a prismoidal outline.

9. In a wave director apparatus for testing a member, an ultrasonic transducer for generating sound signals, signal shaping and collimating means coupled to said transducer for receiving or transmitting signals therefrom and for forming said signals into a beam having a predetermined pattern, said shaping and collimating means including a shaper and a collimator coupled together in series, said shaper including a solid block of ultrasound transmitting material having an input surface to receive ultrasound from said transducer and an output surface having a predetermined desired cross-section, the region between said input surface and said output surface being gradually changed to shape the beam to the desired configuration of said output surface, said collimator including a bundle of sound transmitting fibers bound together and terminating in a surface adapted to be placed in contact with the output surface of said shaper and having a second output surface, coupling means having an input surface urged into intimate contact with said output surface of said shaping and collimating means and having a second surface adapted to be pressed into intimate contact at a location on said member said coupling means serving to transmit the beam between said output surface and said second surface, said input surface of said coupling means being formed at a substantial angle to the normal of the surface of the member at said location, said coupling means being constructed and arranged for rotation about the normal of the second surface at said location so that ultrasonic wave trains can be scanned about the member.

10. Apparatus as in claim 9 wherein said shaper is a solid block of ultrasound transmitting material having a plurality of holes formed in its side walls, said holes terminating at the boundary of the region of desired ultrasound signal transmission and being filled with sound absorbent material.

11. In wave director apparatus, shaping and collimating means comprising a plurality of elongate, solid fibers bound together in a bundle, each of said fibers terminating at one end in the first common surface for ultrasonic communication with an ultrasonic transducer and terminating at their other ends in a second common surface, said bundle of fibers defining individual collimated ultrasound paths therealong, said fibers further being gradually rearranged portions intermediate said first and second surfaces to achieve a predetermined shape at said second surface whereby said fibers serve to form the ultrasound into a beam corresponding to the shape of said second common surface.

12. Wave director apparatus as in claim 11 wherein each of said fibers is made of metal.

13. Wave director apparatus as in claim 1 wherein said fiber bundle is gradually rearranged at portions intermediate said first and second surfaces to achieve said predetermined shape at said second surface.

References Cited

UNITED STATES PATENTS

| | | | |
|---|---|---|---|
| 3,299,696 | 1/1967 | Dickenson | 73—71.5 |
| 3,325,781 | 6/1967 | Harris | 340—15 |
| 3,423,993 | 1/1969 | Lynnworth | 73—71.5 |

RICHARD C. QUEISSER, Primary Examiner

J. P. BEAUCHAMP, Assistant Examiner

U.S. Cl. X.R.

73—67.5